_US011161972B2_

United States Patent
Usui et al.

(10) Patent No.: US 11,161,972 B2
(45) Date of Patent: Nov. 2, 2021

(54) ETHYLENE-VINYL ALCOHOL COPOLYMER COMPOSITION, MELT-FORMING MATERIAL, MULTILAYER STRUCTURE, AND CONTAINER THERMOFORMING MATERIAL

(71) Applicant: Mitsubishi Chemical Corporation, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/823,386

(22) Filed: Mar. 19, 2020

(65) Prior Publication Data

US 2020/0216655 A1   Jul. 9, 2020

Related U.S. Application Data

(63) Continuation of application No. PCT/JP2018/043111, filed on Nov. 22, 2018.

(30) Foreign Application Priority Data

Nov. 22, 2017   (JP) .............................. JP2017-224606

(51) Int. Cl.
| | | |
|---|---|---|
| *C08L 29/06* | (2006.01) | |
| *B32B 27/08* | (2006.01) | |
| *B32B 27/30* | (2006.01) | |
| *B65D 65/40* | (2006.01) | |

(52) U.S. Cl.
CPC .............. *C08L 29/06* (2013.01); *B32B 27/08* (2013.01); *B32B 27/306* (2013.01); *B65D 65/40* (2013.01); *B32B 2439/00* (2013.01); *C08L 2203/30* (2013.01); *C08L 2205/025* (2013.01)

(58) Field of Classification Search
CPC .............. C08L 29/06; C08L 2205/025; C08L 2203/30; B65D 65/40; B32B 27/306; B32B 2439/00; B32B 27/08
USPC ........................................................ 524/315
See application file for complete search history.

(56) References Cited

U.S. PATENT DOCUMENTS

| | | |
|---|---|---|
| 5,744,547 A | 4/1998 | Moritani et al. |
| 2005/0147778 A1 | 7/2005 | Tai et al. |
| 2007/0196679 A1 | 8/2007 | Moriyama et al. |
| 2013/0040157 A1* | 2/2013 | Igarashi ................. C08L 23/02 428/520 |
| 2013/0065001 A1* | 3/2013 | Kani ......................... B32B 1/02 428/35.7 |
| 2015/0152256 A1* | 6/2015 | Nakazawa ............... C08K 5/07 428/35.7 |
| 2016/0177080 A1 | 6/2016 | Inoue |
| 2016/0244601 A1 | 8/2016 | Kawai |
| 2017/0183426 A1 | 6/2017 | Kawai et al. |
| 2018/0319965 A1 | 11/2018 | Seno et al. |

FOREIGN PATENT DOCUMENTS

| | | |
|---|---|---|
| EP | 2554590 A1 | 2/2013 |
| EP | 2862897 A1 | 4/2015 |
| JP | 63-230757 A | 9/1988 |
| JP | 3-281542 | 12/1991 |
| JP | 8-311276 A | 11/1996 |
| JP | 09-71620 A | 3/1997 |
| JP | 2006-124668 A | 5/2006 |
| JP | 2007-261075 A | 10/2007 |
| JP | 2010-241862 A | 10/2010 |
| JP | 2015-071694 A | 4/2015 |
| JP | 2016-029157 A | 3/2016 |
| WO | 2003-072653 A1 | 9/2003 |
| WO | 2011-118762 A1 | 9/2011 |
| WO | 2015-041135 | 3/2015 |
| WO | 2017-082063 A1 | 5/2017 |

OTHER PUBLICATIONS

EESR issued in EP Patent Application No. 18881555.9, dated Nov. 5, 2020.
ISR issued in WIPO Patent Application No. PCT/JP2017/019451, dated Aug. 15, 2018, English translation.
IPRP issued in WIPO Patent Application No. PCT/JP2017/019451, dated Nov. 27, 2018, English translation.
ISR issued in WIPO Patent Application No. PCT/JP2018/043111, dated Feb. 19, 2019, English translation.
IPRP issued in WIPO Patent Application No. PCT/JP2018/043111, dated May 26, 2020, English translation.

* cited by examiner

*Primary Examiner* — Hui H Chin
(74) *Attorney, Agent, or Firm* — Greenblum & Bernstein, P.L.C.

(57) ABSTRACT

A thermoformable ethylene-vinyl alcohol copolymer composition contains: (A) an ethylene-vinyl alcohol copolymer comprising two or more ethylene-vinyl alcohol copolymers having different ethylene structural unit contents; and (B) a sorbic acid ester; wherein the sorbic acid ester (B) is present in an amount of 0.00001 to 10 ppm based on the weight of the ethylene-vinyl alcohol copolymer composition. The ethylene-vinyl alcohol copolymer composition is excellent in coloration-suppressing effect.

7 Claims, No Drawings

ETHYLENE-VINYL ALCOHOL COPOLYMER COMPOSITION, MELT-FORMING MATERIAL, MULTILAYER STRUCTURE, AND CONTAINER THERMOFORMING MATERIAL

RELATED APPLICATION

This application is a continuation of International Application No. PCT/JP2018/043111, filed on Nov. 22, 2018, which claims priority to Japanese Patent Application No. 2017-224606, filed on Nov. 22, 2017, the entire contents of each of which being hereby incorporated by reference.

TECHNICAL FIELD

The present disclosure relates to an ethylene-vinyl alcohol copolymer composition (hereinafter referred to as "EVOH resin composition") containing an ethylene-vinyl alcohol copolymer (hereinafter referred to as "EVOH"), a melt-forming material prepared by using the EVOH resin composition, a multilayer structure, and a container thermoforming material. More specifically, the present disclosure relates to an EVOH resin composition excellent in heat stability, a melt-forming material formed from the EVOH resin composition, a multilayer structure including a layer formed from the EVOH resin composition, and a container thermoforming material.

BACKGROUND ART

EVOH is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials.

The stretchability of the EVOH tends to be improved, as the ethylene structural unit content (hereinafter referred to as "ethylene content") of the EVOH increases. On the other hand, the gas barrier property of the EVOH is deteriorated as the ethylene content of the EVOH increases (as the vinyl alcohol structural unit content (hereinafter referred to as "vinyl alcohol content") of the EVOH decreases). In order to satisfy requirements for both the gas barrier property and the stretchability, it is proposed to use an EVOH having a higher vinyl alcohol content (i.e., a lower ethylene content and a higher saponification degree) and an EVOH having a lower vinyl alcohol content (i.e., a higher ethylene content and a lower saponification degree) in combination.

For example, PTL 1 discloses a composition prepared by using EVOHs having different ethylene contents and different saponification degrees. PTL 1 states that, where two EVOHs used in combination for an EVOH resin composition have a difference of not less than 4 mol % in ethylene content, a difference of not less than 3 mol % in saponification degree, and a difference of not less than a predetermined value in solubility parameter, a product formed from a laminate including an intermediate layer of the EVOH resin composition and a polystyrene layer by a vacuum pressure forming process is excellent in transparency, appearance, and gas barrier property, and is free from cracking and uneven thickness.

PTL 2 discloses an EVOH resin composition that contains two EVOHs having a difference of 3 to 20 mol % in ethylene content, and has a specific boron concentration. PTL 2 further discloses that a laminate film including an intermediate layer of the EVOH resin composition and polypropylene layers provided on the intermediate layer with the intervention of adhesive resin layers is free from whitening, streaking, and other stretching unevenness even when being heat-stretched (longitudinally four times and then transversely six times).

With the use of the arts described above, various products are produced by a melt-forming process such as an extrusion process or an injection process. The EVOH resin compositions are susceptible to thermal degradation when being melt-formed. In the methods in which the different EVOHs are used, particularly, the EVOHs having different melting points are melt-formed at a single temperature and, therefore, an EVOH having a lower melting point is liable to be thermally degraded. Hence, the EVOH resin compositions tend to be poorer in heat stability, and are susceptible to coloration.

A known exemplary method for suppressing the coloration of the EVOH resin composition containing the different EVOHs is to use EVOHs each satisfying a predetermined requirement for a molecular weight as measured after heat treatment at 220° C. for 50 hours in a nitrogen atmosphere (see, for example, PTL 3).

RELATED ART DOCUMENT

Patent Document

PTL 1: JP-A-SH063(1988)-230757
PTL 2: JP-A-HEI8(1996)-311276
PTL 3: JP-A-2016-29157

SUMMARY

Although the EVOH resin compositions disclosed in PTL 1 to PTL 3 are excellent in gas barrier property, and thermoformability such as stretchability, further improvement is required for the suppression of the coloration.

In view of the foregoing, the present disclosure provides an EVOH resin composition that contains two or more EVOHs having different melting points and is excellent in coloration-suppressing effect.

As a result of intensive studies conducted in view of the foregoing, the inventors found that, where a specific very small amount of a sorbic acid ester is blended in the EVOH resin composition containing the two or more EVOHs having different melting points, the EVOH resin composition is excellent in coloration-suppressing effect.

According to a first aspect of the present disclosure, there is provided an EVOH resin composition containing: (A) an EVOH including two or more EVOHs having different ethylene structural unit contents; and (B) a sorbic acid ester; wherein the sorbic acid ester (B) is present in an amount of 0.00001 to 10 ppm based on the weight of the EVOH resin composition. According to a second aspect of the present disclosure, a melt-forming material formed from the EVOH resin composition is provided. According to a third aspect of the present disclosure, a multilayer structure including a layer formed from the EVOH resin composition is provided. According to a fourth aspect of the present disclosure, a container thermoforming material formed from the multilayer structure is provided.

The EVOH resin composition contains the EVOH (A) including the two or more EVOHs having different ethylene contents, and the sorbic acid ester (B). In the EVOH resin composition, the sorbic acid ester (B) is present in an amount of 0.00001 to 10 ppm based on the weight of the EVOH resin composition. Thus, the EVOH resin composition is excellent in coloration-suppressing effect, even though containing the two or more EVOHs having different melting points.

Where a difference in ethylene content between an EVOH having the highest ethylene content and an EVOH having the lowest ethylene content in the EVOH (A) including the two or more EVOHs having different ethylene contents is not less than 2 mol %, the coloration-suppressing effect is further improved.

Where the EVOH (A) including the two or more EVOHs having different ethylene contents at least includes: (A1) an EVOH having an ethylene content of less than 35 mol %; and (A2) an EVOH having an ethylene content of not less than 35 mol %, the coloration-suppressing effect is still further improved.

Where the blend weight ratio of the EVOH (A1) having an ethylene content of less than 35 mol % to the EVOH (A2) having an ethylene content of not less than 35 mol % is (A1)/(A2)=1/99 to 99/1, the coloration-suppressing effect is still further improved.

The melt-forming material formed from the EVOH resin composition of the present disclosure is thermoformable, and is excellent in coloration-suppressing effect. Therefore, the melt-forming material can be advantageously used as a packaging material, particularly as a container thermoforming material, for example, for foods, chemical agents, agricultural chemicals, and the like.

The multilayer structure including the layer formed from the EVOH resin composition of the present disclosure is thermoformable, and is excellent in coloration-suppressing effect. Therefore, the multilayer structure can be formed into various products, which can be advantageously used as packaging materials, particularly as container thermoforming materials, for example, for foods, chemical agents, agricultural chemicals, and the like.

DESCRIPTION OF EMBODIMENTS

Preferred embodiments of the present disclosure will hereinafter be described in detail. It should be understood that these preferred embodiments are illustrative but not limitative.

<EVOH Resin Composition>

An EVOH resin composition of the present disclosure contains: (A) an EVOH including two or more EVOHs having different ethylene contents; and (B) a sorbic acid ester. The EVOH resin composition of the present disclosure contains the EVOH (A) as a major component. In the EVOH resin composition, the proportion of the EVOH (A) is typically not less than 70 wt. %, preferably not less than 80 wt. %, more preferably not less than 90 wt. %. The components of the EVOH resin composition of the present disclosure will hereinafter be described in turn.

[EVOH (A)]

The EVOH (A) to be used in the present disclosure is a water-insoluble thermoplastic resin that is typically prepared by copolymerizing ethylene and a vinyl ester monomer and then saponifying the resulting copolymer, and is generally referred to as ethylene-vinyl alcohol copolymer or saponified ethylene-vinyl ester copolymer. The EVOH (A) to be used in the present disclosure includes the two or more EVOHs having different ethylene contents. In the present disclosure, the ethylene contents of the EVOHs are each determined in conformity with ISO14663.

In the EVOH (A), a difference in ethylene content between an EVOH having the highest ethylene content and an EVOH having the lowest ethylene content is preferably not less than 2 mol %, more preferably 2 to 25 mol %, still more preferably 4 to 20 mol %, particularly preferably 5 to 18 mol %. If the difference in ethylene content is excessively small, it will be difficult to properly balance the formability and the gas barrier property. If the difference in ethylene content is excessively great, the compatibility between the EVOHs tends to be reduced.

The difference in ethylene content between the two or more EVOHs of the EVOH (A) is determined, for example, by measuring melt peak temperatures. More specifically, the ethylene contents of the two or more EVOHs of the EVOH (A) can be calculated based on the measurement of the melt peak temperatures of the EVOH resin composition of the present disclosure, because the ethylene contents of the EVOHs generally correlate with the melting points of the EVOHs. The melt peak temperatures are defined as peak temperatures determined by increasing the temperature at 10° C./minute from −50° C. to 230° C., reducing the temperature at 10° C./minute from 230° C. to −50° C., and increasing the temperature again at 10° C./minute from −50° C. to 230° C. by means of a differential scanning calorimeter (DSC).

A difference between the melt peak temperatures determined by the aforementioned measurement method for the EVOH resin composition of the present disclosure is typically not less than 3° C., preferably 3° C. to 40° C., more preferably 6° C. to 24° C., particularly preferably 8° C. to 16° C. If the melt peak temperature difference is excessively small, it tends to be difficult to properly balance the formability and the gas barrier property. If the melt peak temperature difference is excessively great, the compatibility between the EVOHs tends to be reduced.

The number of the EVOHs having different ethylene contents in the EVOH (A) is typically 2 to 4, preferably 2 to 3, particularly preferably 2. If a greater number of EVOHs are used, the EVOH resin composition tends to be poorer in productivity and economy.

The number of the EVOHs having different ethylene contents in the EVOH resin composition can be confirmed based on the number of peaks observed by means of the DSC.

From the viewpoint of the heat stability, the EVOH (A) to be used in the present disclosure preferably at least includes: (A1) an EVOH having an ethylene content of less than 35 mol % (hereinafter referred to as "EVOH (A1)"); and (A2) an EVOH having an ethylene content of not less than 35 mol % (hereinafter referred to as "EVOH (A2)").

The EVOH (A1) typically has an ethylene content of less than 35 mol %, preferably 20 to 34 mol %, more preferably 22 to 34 mol %, particularly preferably 25 to 33 mol %. If the ethylene content of the EVOH (A1) is excessively low, the decomposition temperature and the melting point of the EVOH (A1) will be excessively close to each other, making the melt-forming of the EVOH resin composition difficult. If the ethylene content of the EVOH (A1) is excessively high, on the other hand, the EVOH (A1) tends to provide an insufficient gas barrier property-imparting effect.

On the other hand, the EVOH (A2) typically has an ethylene content of not less than 35 mol %, preferably 35 to 60 mol %, more preferably 36 to 56 mol %, particularly preferably 37 to 45 mol %. If the ethylene content of the EVOH (A2) is excessively low, the EVOH (A2) tends to provide a poorer stretchability-improving effect, thereby deteriorating the secondary formability. If the ethylene content of the EVOH (A2) is excessively high, on the other hand, it will be necessary to select an EVOH having a higher ethylene content as the other EVOH to control the ethylene content difference within the predetermined range. As a result, a layer of the EVOH resin composition will have an insufficient gas barrier property.

The EVOH (A1) typically has a vinyl ester saponification degree of not less than 90 mol %, preferably 95 to 100 mol %, particularly preferably 98 to 100 mol %, as measured in conformity with JIS K6726 (with the use of a solution obtained by homogenously dissolving the EVOH in a water/methanol solvent). If the saponification degree of the EVOH (A1) is excessively low, the EVOH (A1) tends to provide an insufficient gas barrier property imparting effect.

On the other hand, the EVOH (A2) typically has a vinyl ester saponification degree of not less than 90 mol %, preferably 93 to 100 mol %, particularly preferably 98 to 100 mol %, as measured in conformity with JIS K6726 (with the use of a solution obtained by homogeneously dissolving the EVOH in a water/methanol solvent). If the saponification degree of the EVOH (A2) is excessively low, the EVOH (A2) tends to provide an insufficient gas barrier property imparting effect.

The EVOH (A1) typically has a melt flow rate (MFR) of 1 to 100 g/10 minutes, preferably 2 to 50 g/10 minutes, particularly preferably 3 to 10 g/10 minutes (as measured at 210° C. with a load of 2160 g). If the MFR of the EVOH (A1) is excessively high, the mechanical strength of a product formed from the EVOH resin composition tends to be reduced. If the MFR of the EVOH (A1) is excessively low, the extrudability of the EVOH resin composition tends to be deteriorated.

The EVOH (A2) typically has a melt flow rate (MFR) of 1 to 100 g/10 minutes, preferably 2 to 50 g/10 minutes, particularly preferably 3 to 30 g/10 minutes (as measured at 210° C. with a load of 2160 g). If the MFR of the EVOH (A2) is excessively high, the mechanical strength of a product formed from the EVOH resin composition tends to be reduced. If the MFR of the EVOH (A2) is excessively low, the extrudability of the EVOH resin composition tends to be deteriorated.

The EVOH (A1) and the EVOH (A2) to be used in combination preferably have substantially the same resin flowability in the melt forming. Therefore, the saponification degrees and the like of the EVOH (A1) and the EVOH (A2) are preferably controlled so that a difference (ΔMFR) in MFR (as measured at 210° C. with a load of 2160 g) between the EVOH (A1) and the EVOH (A2) is not greater than 5 g/10 minutes, more preferably not greater than 1.5 g/10 minutes.

The blend weight ratio of the EVOH (A1) to the EVOH (A2) (EVOH (A1)/EVOH (A2)) is typically 99/1 to 1/99, preferably 90/10 to 10/90, more preferably 90/10 to 50/50, particularly preferably 88/12 to 60/40, especially preferably 85/15 to 70/30. If the ratio of the EVOH (A1) is excessively low, a layer of the EVOH resin composition tends to have an insufficient gas barrier property. If the ratio of the EVOH (A1) is excessively high, the stretchability improving effect tends to be reduced.

The EVOHs having different ethylene contents may be provided, for example, in the following manner.

As described above, the EVOHs are typically each prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for copolymerization of ethylene and the vinyl ester monomer. In general, a solution polymerization method using methanol as a solvent is utilized. The saponification of the resulting ethylene-vinyl ester copolymer may be achieved by a known method.

The EVOHs thus prepared each mainly contain an ethylene structural unit and a vinyl alcohol structural unit, and generally further contain a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The EVOHs to be used in the present disclosure typically each have a vinyl ester saponification degree of 90 to 100 mol %, preferably 95 to 100 mol %, particularly preferably 99 to 100 mol %, as measured in conformity with JIS K6726 (with the use of a solution obtained by homogeneously dissolving the EVOH in a water/methanol solvent). If the saponification degree of the EVOH is excessively low, the gas barrier property, the heat stability, the moisture resistance, and the like tend to be deteriorated.

The EVOHs typically each have a melt flow rate (MFR) of 0.5 to 100 g/10 minutes, preferably 1 to 50 g/10 minutes, particularly preferably 2 to 35 g/10 minutes (as measured at 210° C. with a load of 2160 g). If the MFR of the EVOH is excessively high, the film formability tends to be unstable. If the MFR of the EVOH is excessively low, the EVOH resin composition tends to have an excessively high viscosity, making melt extrusion difficult.

The EVOHs typically each have an ethylene structural unit content of 20 to 60 mol %, preferably 25 to 50 mol %, particularly preferably 25 to 45 mol %. If the ethylene structural unit content of the EVOH is excessively low, the high-humidity gas barrier property and the melt-formability tend to be deteriorated in applications requiring the gas barrier property. If the ethylene structural unit content of the EVOH is excessively high, on the other hand, the gas barrier property tends to be deteriorated.

The ethylene contents of the EVOHs can be each controlled by adjusting the pressure of ethylene to be supplied when the vinyl ester monomer and ethylene are copolymerized. Thus, the EVOHs having different ethylene contents can be prepared.

The EVOHs to be used in the present disclosure may further each contain a structural unit derived from any of the following comonomers in an amount that does not impair the effects of the present disclosure (e.g., typically in an amount of not greater than 20 mol %, preferably not greater than 10 mol %, of the EVOH).

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products (acylation products)

of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH containing a structural unit having a primary hydroxyl group in its side chain among structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH contains the structural unit having the primary hydroxyl group in its side chain, the primary hydroxyl group content is typically 0.1 to 20 mol %, preferably 0.1 to 15 mol %, particularly preferably 0.1 to 10 mol %.

In the present disclosure, post-modified EVOHs such as urethanized EVOH, acetalized EVOH, cyanoethylated EVOH, and oxyalkylenated EVOH are also usable as the EVOHs.

The EVOH (A) to be used in the present disclosure includes two or more EVOHs having different ethylene contents and selected from EVOHs prepared in the aforementioned manner.

[Sorbic Acid Ester (B)]

In the present disclosure, the EVOH resin composition containing the EVOH (A) including the two or more EVOHs having different ethylene contents further contains the sorbic acid ester (B) in a specific very small amount, whereby a remarkable coloration-suppressing effect is provided.

In a mixture of the two or more EVOHs, as described above, an EVOH having a lower melting point (a lower ethylene content) is liable to degrade. Therefore, it is supposed that the EVOH resin composition includes portions having a lower ethylene content and susceptible to the degradation and portions having a higher ethylene content and less susceptible to the degradation.

In the present disclosure, a reason why the coloration of the EVOH resin composition is suppressed by the blending of the specific very small amount of the sorbic acid ester (B) is supposedly that the sorbic acid ester (B) has a lower polarity and, therefore, can be homogeneously dispersed in the EVOH (A) even if being present in the very small amount in the EVOH resin composition. It is considered that the sorbic acid ester (B) is hydrolyzed to generate sorbic acid, which in turn captures radicals, whereby the excellent coloration-suppressing effect is provided. Further, it is supposed that a so-called catalytic cycle occurs in which an alcohol resulting from the hydrolysis of the sorbic acid ester (B) reacts with sorbic acid capturing the radicals, whereby the sorbic acid ester (B) is generated, and then the sorbic acid ester (B) thus generated is thermally hydrolyzed again.

It is supposed that sorbic acid capable of capturing the radicals thus constantly occurs and, therefore, the radicals can be captured in the EVOH resin composition at the early stage of the radical generation, making it possible to provide the excellent coloration-suppressing effect. It is also supposed that, in the present disclosure in which the EVOH resin composition contains the sorbic acid ester (B) in the specific very small amount, the aforementioned cycle can efficiently work, making it possible to provide the remarkable coloration-suppressing effect.

A sorbic acid ester prepared by condensation of sorbic acid and an alcohol or a phenol derivative, for example, is usable as the sorbic acid ester (B). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (B) is relatively low, the coloration-suppressing effect of the EVOH resin composition is improved. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate and ethyl sorbate are most preferred. Ethyl sorbate is especially preferred.

The sorbic acid ester (B) typically has a molecular weight of 120 to 220, preferably 120 to 200, particularly preferably 120 to 160. Where the molecular weight of the sorbic acid ester (B) falls within the aforementioned range, the coloration-suppressing effect tends to be efficiently provided.

The amount of the sorbic acid ester (B) contained in the EVOH resin composition is 0.00001 to 10 ppm, preferably 0.00005 to 5 ppm, more preferably 0.0001 to 3 ppm, particularly preferably 0.0005 to 0.5 ppm, especially preferably 0.001 to 0.1 ppm, based on the weight of the EVOH resin composition. Where the amount of the sorbic acid ester (B) falls within the aforementioned range, the coloration-suppressing effect is excellent. If the amount of the sorbic acid ester (B) is excessively great, the number of conjugated double bonds is excessively great, so that the coloration is liable to result.

In the case of pellets and other products formed from the EVOH resin composition of the present disclosure, the amount of the sorbic acid ester (B) contained in the EVOH resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (B) is determined.

In the case of a formed product containing the EVOH resin composition and some other thermoplastic resin or the like (e.g., a multilayer structure), a layer of the EVOH resin composition to be analyzed is taken out of the multilayer structure by a given method, and the measurement is performed in the aforementioned manner.

[Other Thermoplastic Resin]

The EVOH resin composition of the present disclosure may contain a thermoplastic resin other than the EVOH (A) as a resin component typically in an amount that does not impair the effects of the present disclosure (e.g., in an amount of typically not greater than 30 wt. %, preferably not greater than 10 wt. %, based on the weight of the EVOH resin composition).

Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-$\alpha$-olefin (C4 to C20 $\alpha$-olefin) copolymers, ethylene-acrylate copolymers, polypropylenes, propylene-$\alpha$-olefin (C4 to C20 $\alpha$-olefin) copolymers, polybutenes, and polypentenes, polycycloolefins, polyolefin resins in a broader sense such as modified polyolefin resins obtained by graft-modifying any of the aforementioned olefin homopolymers and copolymers with an unsaturated carboxylic acid or an unsaturated carboxylic acid ester, polystyrene resins, polyesters, chlorinated vinyl resins such as polyvinyl chlorides and polyvinylidene chlorides, acrylic resins, polyamide resins, vinyl ester resins, polyester elastomers, polystyrene elastomers, polyurethane elastomers, chlorinated polyethylenes, and chlorinated polypropylenes. These thermoplastic resins may be used alone or in combination.

[Other Additives]

As required, the EVOH resin composition of the present disclosure may contain known additives in addition to the aforementioned components in amounts that do not impair the effects of the present disclosure (e.g., in amounts of not greater than 10 wt. % based on the overall weight of the EVOH resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a molecular weight of about 500 to about 10,000); drying agent; oxygen absorber; inorganic filler; heat stabilizer; photo stabilizer; flame retardant; crosslinking agent; curing agent; foaming agent; crystal nucleating agent; antifogging agent; biodegradation agent; silane coupling agent; anti-blocking agent; antioxidant; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and salts of the inorganic acids such as alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferably blended as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, formation of a uniform film tends to be difficult.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, formation of a uniform film tends to be difficult.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, formation of a uniform film tends to be difficult. Where two or more salts are blended in the EVOH resin composition, the total amount of the two or more salts preferably falls within the aforementioned range.

[EVOH Resin Composition Production Method]

The EVOH resin composition of the present disclosure is produced by using the EVOH (A) and the sorbic acid ester (B) as the essential components and, as required, using any of the aforementioned additives as an optional component. Specific examples of a method for the production include: a method including the steps of mixing together plural EVOHs having different ethylene contents to prepare the EVOH (A), and blending the sorbic acid ester (B) with the EVOH (A); a method including the steps of blending the sorbic acid ester (B) with at least one of plural EVOHs of the EVOH (A), and blending the resulting mixture with the other at least one EVOH of the EVOH (A); and a method including the steps of blending a part of the sorbic acid ester (B) with at least one of plural EVOHs of the EVOH (A), blending the rest of the sorbic acid ester (B) with the other at least one EVOH of the EVOH (A), and mixing the resulting mixtures together.

Known examples of a mixing method to be used for mixing the plural EVOHs having different ethylene contents in the preparation of the EVOH (A) include dry blending (pellet blending) method, melt mixing (compounding) method, and solution mixing method.

An example of the dry blending (pellet blending) method is a method (I) including the step of mixing pellets of the plural EVOHs having different ethylene contents by means of a tumbler or the like.

An example of the melt mixing (compounding) method is a method (II) including the steps of melt-kneading the plural EVOHs having different ethylene contents by means of a twin screw extruder or the like, and pelletizing the resulting mixture.

Examples of the solution mixing method include a method (III) including the steps of dissolving and mixing the EVOHs having different ethylene contents in a solvent, forming the resulting solution into pellets by a known method such as strand method, hot cutting method or in-water cutting method, and drying the resulting pellets, and a method (IV) including the steps of dissolving and mixing plural ethylene-vinyl ester copolymers (plural EVOH precursors) having different ethylene contents in a solvent, subjecting the resulting solution to saponification, forming the resulting solution of the EVOH (A) into pellets by a known method such as strand method, hot cutting method or in-water cutting method, and drying the resulting pellets.

Known exemplary methods for blending the sorbic acid ester (B) with the EVOH (A) or for blending the sorbic acid ester (B) with the at least one of the EVOHs of the EVOH (A) include dry blending method, melt mixing method, solution mixing method, and impregnation method, which may be used in combination.

An example of the dry blending method is a method (i) including the step of dry-blending the sorbic acid ester (B) with pellets of the at least one of the EVOHs of the EVOH (A) or pellets of the EVOH (A) by means of a tumbler or the like.

Examples of the melt mixing method include a method (ii) including the steps of dry-blending the sorbic acid ester (B) with pellets of the at least one of the EVOHs of the EVOH (A) or pellets of the EVOH (A), melt-kneading the resulting blend, and forming the resulting melt into pellets or a product, and a method (iii) including the steps of adding the sorbic acid ester (B) to a melt of the at least one of the EVOHs of the EVOH resin (A) or a melt of the EVOH (A), melt-kneading the resulting mixture, and forming the resulting melt into pellets or a product.

Examples of the solution mixing method include a method (iv) including the steps of preparing a solution by using pellets of the at least one of the EVOHs of the EVOH (A) or pellets of the EVOH (A), adding the sorbic acid ester (B) to the solution, solidifying and forming the resulting solution into pellets, separating the pellets from the solution, and drying the pellets, and a method (v) including the steps of adding the sorbic acid ester (B) to a homogeneous solution (water/alcohol solution or the like) containing the at least one of the EVOHs of the EVOH (A) after the saponification in the preparation of the at least one EVOH, solidifying and forming the resulting solution into pellets, separating the pellets from the solution, and drying the pellets.

An example of the impregnation method is a method (vi) including the steps of bringing pellets of the at least one of the EVOHs of the EVOH (A) or pellets of the EVOH (A) into contact with an aqueous solution containing the sorbic acid ester (B) to impregnate the pellets with the sorbic acid ester (B), and then drying the resulting pellets.

In the methods described above, a composition (master batch) containing the sorbic acid ester (B) at a higher concentration may be prepared by blending a predetermined proportion of the sorbic acid ester (B) with the at least one of the EVOHs of the EVOH (A) or with the EVOH (A), and the EVOH resin composition may be produced as containing the sorbic acid ester (B) at a predetermined concentration by blending the master batch with the other at least one EVOH of the EVOH (A) or with the EVOH (A).

In the present disclosure, different methods may be selected from the aforementioned methods (I) to (III) and (i) to (vi) to be used in combination. A method in which EVOH resin composition pellets are produced by the method (v) including the steps of adding the sorbic acid ester (B) to a homogeneous solution (water/alcohol solution or the like) containing the at least one of the EVOHs of the EVOH (A) after the saponification in the preparation of the at least one EVOH, solidifying and forming the resulting solution into pellets, separating the pellets from the solution, and drying the pellets, and are blended with the other EVOH by the dry blending method (I) or the melt mixing method (II) is preferred in terms of the productivity. Further, the melt mixing method is preferred, and the method (ii) is particularly preferred, because the EVOH resin composition produced by these methods is significantly improved in productivity and the effects of the present disclosure.

Where any of the aforementioned additives is blended as the optional component in the EVOH resin composition, the aforementioned production methods may be employed for blending the optional component in the EVOH resin composition.

Pellets of the EVOH resin composition to be produced by any of the aforementioned methods, and the pellets of the EVOHs or the EVOH (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

The EVOH resin composition of the present disclosure typically has a water content of 0.01 to 0.5 wt. %, preferably 0.05 to 0.35 wt. %, particularly preferably 0.1 to 0.3 wt. %.

In the present disclosure, the water content of the EVOH resin composition is measured and calculated by the following method.

The weight (W1) of a sample of the EVOH resin composition is measured at a room temperature (25° C.) by an electronic balance before drying, and the sample is dried at 150° C. for 5 hours in a hot air dryer. After the drying, the sample is cooled in a desiccator for 30 minutes. After the temperature of the sample of the EVOH resin composition is returned to the room temperature, the weight (W2) of the sample is measured. The water content of the EVOH resin composition is calculated from the following expression:

Water content (wt. %)=[(W1−W2)/W1]×100

The EVOH resin composition of the present disclosure may be produced in any of various forms, e.g., in pellet form, powdery form, or liquid form, for use as a forming material for various formed products. Particularly, the EVOH resin composition of the present disclosure is preferably provided as a melt-forming material, because the effects of the present disclosure tend to be more efficiently provided. The EVOH resin composition of the present disclosure may be a resin composition prepared by mixing the EVOH resin composition with a resin other than the EVOH (A).

The pellets of the EVOH resin composition of the present disclosure may be used as they are for the melt forming. In order to ensure stable feeding of the EVOH resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the EVOH resin composition.

Exemplary products to be formed from the EVOH resin composition of the present disclosure for practical applications include a single-layer film formed by using the EVOH resin composition of the present disclosure, and a multilayer structure including a layer formed by using the EVOH resin composition of the present disclosure.

[Multilayer Structure]

A multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where EVOH resin composition layers a (a1, a2, . . . ) and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the EVOH resin composition layer and the base resin layer in the multilayer structure, the adhesive resin layer is located in contact with the EVOH resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The EVOH resin composition layer formed from the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

Since the resin composition of the present disclosure is thermoformable, the multilayer structure described above can be advantageously thermoformed in stretching process, drawing process, and the like. The resin composition and the multilayer structure of the present disclosure are advantageous as materials for cups, trays, tubes, bottles, and other containers to be produced by the thermoforming.

The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat setting process.

Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 µm, preferably 30 to 3,000 µm, particularly preferably 50 to 2,000 µm. The thickness of the EVOH resin composition layer is typically 1 to 500 µm, preferably 3 to 300 µm, particularly preferably 5 to 200 µm. The thickness of the base resin layer is typically 5 to 3,000 µm, preferably 10 to 2,000 µm, particularly preferably 20 to 1,000 µm. The thickness of the adhesive resin layer is typically 0.5 to 250 µm, preferably 1 to 150 µm, particularly preferably 3 to 100 µm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like. The EVOH resin composition of the present disclosure, and the multilayer structure including the layer formed from the EVOH resin composition of the present disclosure are thermoformable and less susceptible to the coloration and, therefore, are particularly useful as container thermoforming materials for foods, chemical agents, agricultural chemicals, and the like.

EXAMPLES

Embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of the Examples, pellets of the following EVOH (A1) and EVOH (A2) were prepared.

EVOH (A1): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)

EVOH (A2): Ethylene-vinyl alcohol copolymer having an ethylene structural unit content of 38 mol %, a saponification degree of 100 mol %, and an MFR of 4.3 g/10 minutes (as measured at 210° C. with a load of 2160 g)

Example 1

An EVOH (A) was prepared by dry-blending 80 parts of the pellets of the EVOH (A1) and 20 parts of the pellets of the EVOH (A2). Then, an EVOH resin composition was prepared in an aggregated form by preheating a mixture of 100 parts of the EVOH (A), and 0.0000005 parts (corresponding to 0.005 ppm based on the weight of the EVOH resin composition) of methyl sorbate (available from FUJIFILM Wako Pure Chemical Corporation, and having a molecular weight of 126) as the sorbic acid ester (B) at 230° C. for 5 minutes by means of a plastograph (available from Brabender Corporation), then melt-kneading the mixture at 230° C. for 5 minutes while operating the plastograph at 50 rpm, and cooling and solidifying the resulting melt mixture. The EVOH resin composition thus prepared was pulverized by means of a crusher (SKR16-240 available from Sometani Sangyo Co., Ltd.) with its rotary blade operated at a rotation speed of 650 rpm. The pulverized product of the EVOH resin composition was in a granular form having a size of 1- to 5-mm square. The resin composition had a water content of 0.17%.

Example 2

An EVOH resin composition and a pulverized product of Example 2 were produced in substantially the same manner as in Example 1, except that the amount of methyl sorbate was 0.0001 part (corresponding to 1 ppm based on the weight of the EVOH resin composition). The resin composition had a water content of 0.20%.

Example 3

An EVOH resin composition and a pulverized product of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.14%.

Comparative Example 1

An EVOH resin composition and a pulverized product of Comparative Example 1 were produced in substantially the same manner as in Example 1, except that methyl sorbate was not blended. The resin composition had a water content of 0.13%.

Comparative Example 2

An EVOH resin composition and a pulverized product of Comparative Example 2 were produced in substantially the same manner as in Example 1, except that the amount of methyl sorbate was 0.0015 parts (corresponding to 15 ppm based on the weight of the EVOH resin composition). The resin composition had a water content of 0.20%.

The EVOH resin compositions of Examples 1 to 3 and Comparative Examples 1 and 2 were evaluated for coloration by the following method. The results are shown below in Table 1.

[Coloration Evaluation]

The pulverized products of the EVOH resin compositions prepared in the aforementioned manner were each evaluated for coloration by means of a visual analyzer IRIS VA400 (available from Alpha mos K.K.) based on the percentage of a colored area having Color No. 4076 (R248, G232, B200). Color No. 4076 means a yellowish color, and a higher percentage of the colored area having Color No. 4076 means that the EVOH resin composition was yellowed.

TABLE 1

|  | Example 1 | Example 2 | Example 3 | Comparative Example 1 | Comparative Example 2 |
|---|---|---|---|---|---|
| EVOH (A) | | | | | |
| EVOH (A1) | | | | | |
| Ethylene content (mol %) | 29 | 29 | 29 | 29 | 29 |
| Proportion (parts) | 80 | 80 | 80 | 80 | 80 |
| EVOH (A2) | | | | | |
| Ethylene content (mol %) | 38 | 38 | 38 | 38 | 38 |
| Proportion (parts) | 20 | 20 | 20 | 20 | 20 |
| Sorbic acid ester (B) (ppm) | | | | | |
| Type | Methyl sorbate | Methyl sorbate | Ethyl sorbate | — | Methyl sorbate |
| Amount (ppm) | 0.005 | 1 | 0.005 | — | 15 |
| Coloration evaluation | 6.4 | 9.1 | 5.4 | 19.8 | 14.0 |

As shown above in Table 1, the EVOH resin composition of Comparative Example 2 containing the sorbic acid ester (B) in an amount greater than the range specified by the present disclosure was slightly improved in the suppression of the coloration as compared with the EVOH resin composition of Comparative Example 1 containing the two different EVOHs but not containing the sorbic acid ester (B).

In contrast, the EVOH resin compositions of Examples 1 to 3 each containing the two different EVOHs and further containing the sorbic acid ester (B) in a specific very amount were significantly improved in the suppression of the coloration, though the amounts of the sorbic acid ester (B) were smaller than in Comparative Example 2.

This indicates that the EVOH resin composition of the present disclosure is excellent in coloration-suppressing effect for suppressing the coloration of the EVOH resin composition.

Multilayer structures respectively produced by using the EVOH resin compositions of the Examples produced in the aforementioned manner, and container thermoforming materials of the multilayer structures are excellent in thermoformability, and resistant to coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is thermoformable and excellent in coloration-suppressing effect and, therefore, is particularly useful for various packaging materials, particularly for container thermoforming materials, for various foods, condiments such as mayonnaise and dressing, fermented foods such as miso, fat and oil such as salad oil, beverages, cosmetics, pharmaceutical products, and the like.

The invention claimed is:

1. An ethylene-vinyl alcohol copolymer composition comprising:
    (A) an ethylene-vinyl alcohol copolymer comprising two or more ethylene-vinyl alcohol copolymers having different ethylene structural unit contents; and
    (B) at least one sorbic acid ester selected from the group consisting of methyl sorbate and ethyl sorbate;
    wherein the at least one sorbic acid ester (B) is present in an amount of 0.00001 to 10 ppm based on a weight of the ethylene-vinyl alcohol copolymer composition.

2. The ethylene-vinyl alcohol copolymer composition according to claim 1, wherein a difference in ethylene structural unit content between:
    an ethylene-vinyl alcohol copolymer having a highest ethylene structural unit content, and
    an ethylene-vinyl alcohol copolymer having a lowest ethylene structural unit content in the ethylene-vinyl alcohol copolymer (A) is not less than 2 mol %.

3. The ethylene-vinyl alcohol copolymer composition according to claim 1, wherein the ethylene-vinyl alcohol copolymer (A) comprises:
    (A1) an ethylene-vinyl alcohol copolymer having an ethylene structural unit content of less than 35 mol %; and
    (A2) an ethylene-vinyl alcohol copolymer having an ethylene structural unit content of not less than 35 mol %.

4. The ethylene-vinyl alcohol copolymer composition according to claim 3, wherein the ethylene-vinyl alcohol copolymer (A1) having an ethylene structural unit content of less than 35 mol % and the ethylene-vinyl alcohol copolymer (A2) having an ethylene structural unit content of not less than 35 mol % are present in a weight ratio (A1)/(A2) of 1/99 to 99/1.

5. A melt-forming material comprising the ethylene-vinyl alcohol copolymer composition according to claim 1.

6. A multilayer structure comprising a layer that comprises the ethylene-vinyl alcohol copolymer composition according to claim 1.

7. A container thermoforming material comprising the multilayer structure according to claim 6.

* * * * *